Dec. 9, 1930.  R. D. MERSHON  1,784,674
FILM FORMATION AND OPERATION OF ELECTROLYTIC
CONDENSERS AND OTHER APPARATUS
Filed July 14, 1923
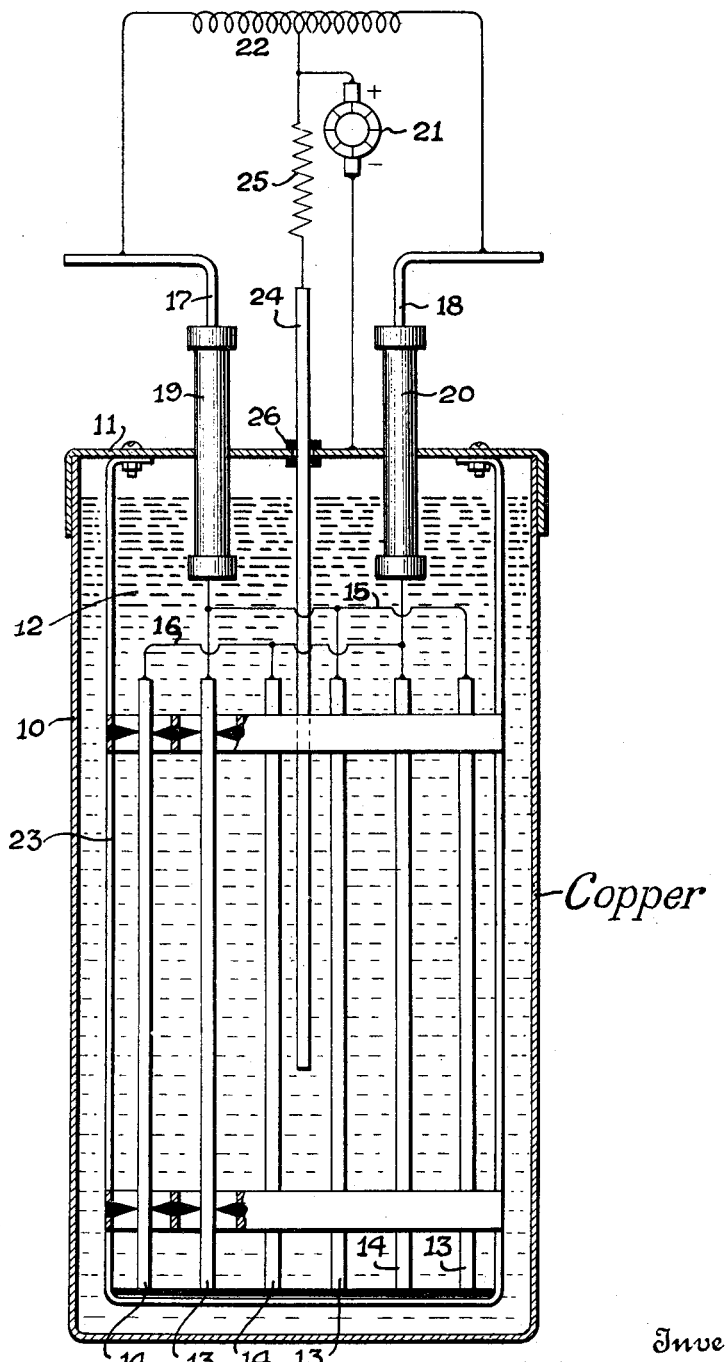
Inventor
Ralph D. Mershon.
By his Attorneys
Cooper, Kerr & Dunham Patented Dec. 9, 1930

1,784,674

UNITED STATES PATENT OFFICE

RALPH D. MERSHON, OF NEW YORK, N. Y.

FILM FORMATION AND OPERATION OF ELECTROLYTIC CONDENSERS AND OTHER APPARATUS

Application filed July 14, 1923. Serial No. 651,478.

This invention relates to electrolytic apparatus, such as condensers, rectifiers, lightning arresters, and other apparatus in which electrodes of aluminum or other filming metal are immersed in a suitable electrolyte, as for example an aqueous solution of borax and boric acid. More particularly the invention relates to the formation of the dielectric films on the active electrodes (or anodes, as they may be conveniently termed) and to the subsequent operation of the condenser or other device, and is based on the discovery that the material of which the inactive parts are made, that is, the tank or vessel in which the electrolyte is contained, the rack in which the anodes are supported, etc., is an important factor in formation of the films and in the operation of the apparatus. Heretofore it has been proposed to make such parts of filming metal, as for example aluminum, and form films thereon, in order to prevent or diminish corrosion. For the best results the filmed inactive parts should be excited, as by connection with the positive pole of a source of unidirectional voltage of suitable value. This method, which is described in my copending application Ser. No. 410,344, filed September 14, 1920, now Patent No. 1,507,395 issued September 2, 1924, is effective for the purpose, but may not always be convenient, and I have accordingly investigated in a series of experiments and practical tests the effects of non-filming metals upon the apparatus, especially upon the formation of the anode films and upon the power factor of the condenser. These investigations have shown that the presence of certain metals, or a salt or other compound thereof, is markedly harmful. Among the specially harmful metals I may mention lead, zinc, and iron, of which lead appears to be the worst, so much so that it seems to permanently "poison" the condenser, its bad effects persisting even after the lead is removed and the electrolyte purified. Other metals, as for example nickel, tin, and silver, or a compound thereof, exert a deleterious influence only when present in the electrolyte, and hence if removed therefrom they are no longer harmful. On the other hand, so far as I have been able to observe, copper has no effect, either in the formation of the films or in the operation of the condenser, even with so much copper or copper compound in the electrolyte as to impart a pronounced green color thereto.

In the accompanying drawing I have illustrated, somewhat diagrammatically, an electrolytic condenser of the excited type.

In this art an excited condenser is one in which unidirectional positive voltage is impressed on each filmed electrode to oppose flow of current thereto from the electrolyte by conduction through the film when the alternating voltage on the condenser reverses. In this way conductive flow of current through the film can take place only toward the electrolyte, not from the electrolyte to the filmed metal, and corrosion of the filmed metal by repeated break-down and reformation of the film is thus prevented. For this purpose the condenser requires a cathode, that is, a conducting member in contact with the electrolyte and connecting the same to the negative side of the circuit which supplies the unidirectional voltage.

Referring to the drawing, 10 represents a tank or vessel having a cover 11 and containing an electrolyte 12 in which are immersed the anodes 13, 14, connected to submerged busses 15, 16. The latter are connected to terminals 17, 18, extending through tubular insulators, 19, 20, to the outside of the tank for connection with an alternating current circuit, not shown. As a source of unidirectional voltage for exciting the condenser a direct current generator is shown at 21, having its positive pole connected to the neutral point of a balance coil or autotransformer 22, the terminals of which are connected to the condenser terminals 17, 18. The negative pole of the source 21 is connected to the electrolyte, preferably by connection with the tank which contains the electrolyte as explained hereinafter. Since the film on an aluminum anode is not perfectly non-conducting, there is more or less leakage of current therethrough to the electrolyte when alternating voltage is impressed on the condenser. This current is of course pulsating. In an excited condenser there is also more or less leakage due to the exciting voltage, and both this current and that due to the alternating voltage pass through the electrolyte by conduction to the cathode.

The supporting rack for the anodes is indicated at 23, and may be suspended from the cover 11 so that when the latter is removed the entire anode assembly will come with it.

In accordance with one feature of my present invention one or more of the inactive parts, for example the tank 10, cover 11, and rack 23, are made of copper. In some cases the parts may be made of some other metal or metals plated or coated with copper, but the difficulty of forming a coating which is perfectly free from pinholes, by which the electrolyte can reach the underlying metal, makes this expedient, in general, undesirable. The copper need not be chemically pure. I have used ordinary commercial copper with complete success.

As stated above, certain metals, notably nickel, tin and silver, are harmful when present in the electrolyte but apparently leave no harmful influences after they have been removed therefrom, and I have observed that such metals can be removed (to a sufficient extent if not completely) by plating them out by electro-deposition on a suitable cathode, which may be the cathode to which the negative pole of the exciting source (as 21 in the drawing) is connected. Accordingly, the inactive parts may be made of or coated with the metals referred to; in which case, in order to insure against contamination of the electrolyte, provision is made for plating the objectionable metal out on a cathode, which, as before stated, may be the exciting cathode. For this purpose the tank itself, or any inactive part in contact with the electrolyte, can be made the exciting and plating cathode. Thus in the drawing the tank 10 is electrically connected with the cover 11, which is itself connected to the negative pole of the exciting source 21. If the exciting current flowing from the anodes to the cathode is not itself sufficient to plate out the deleterious material, a non-filming plating anode 24 may be provided, preferably of carbon or other material which will not permanently affect the apparatus and will not itself be dissolved, extending into the electrolyte and connected to the positive pole of the exciting source through (if necessary) a resistance 25 of such value as to prevent short circuiting and at the same time pass enough current to plate out upon the cathode any metal or metals other than aluminum. It is well known that aluminum cannot be electro-deposited from an aqueous electrolyte. This method may be employed even when all the inactive parts are made of copper, to keep the electrolyte uncontaminated. In the apparatus illustrated the plating anode 24 is supported on and insulated from the tank cover by means of a bushing 26 of glass, porcelain, or other suitable material.

In the foregoing description of the drawings it is assumed that the films have been formed and that the apparatus (in the present instance a condenser) is in operation on an alternating current circuit. The invention may, however, be used with advantage in forming the films. The formation of the films may be carried out by any convenient and suitable method, as for example any of the methods described in my prior patents, particularly those referred to by number and date hereinafter. For purposes of the present case, as illustrative of one method of film formation, it may be assumed that the anodes 13, 14 are unfilmed. Then if they are connected, as by the terminals 17, 18, to a suitable source of alternating current, the desired films will be produced while direct current from the source 21 is flowing to the cathode 10 and is plating out thereon such deleterious metals as may be present and are capable of being removed in this manner. In some cases a better plan is to plate out the harmful metals before the formation of the films is begun. Unidirectional current may be used to form the films. For this purpose all the anodes may be connected to the positive pole of the source of forming current, which may be the exciting source 21, connected to the anodes 13, 14, through the balance coil or autotransformer 22. In this procedure the plating anode may be omitted, or disconnected, in some cases. As the films thicken up, the current passed (through the electrolyte) to the cathode decreases in value, and if it becomes too low to plate out the undersired metals effectively, the plating anode can be connected to the forming source or the exciting source and current passed thence to the cathode to aid in or take up the work of purifying the electrolyte or keeping it uncontaminated. In any case the films are preferably formed at a temperature above that at which the apparatus will subsequently be used, as described in my prior Patent No. 1,012,889, issued December 26, 1911. I also prefer to form the films in the electrolyte in which the anodes will subsequently be used, as explained in my prior Patent No. 1,141,402, issued June 1, 1915.

It is to be understood that the invention is not limited to the construction herein specifically illustrated and described, but can be carried out in other ways without departing from its spirit.

I claim:

1. Electrolytic apparatus of the class described having an electrolyte and inactive parts made of non-filming metal, and means for passing unidirectional current through the electrolyte to electroplate injurious metals out of the same.

2. Electrolytic apparatus of the class described, having an electrolyte, filmed anodes and a non-filming cathode, and means for passing unidirectional current through the electrolyte to the cathode to plate injurious metals upon the latter from the electrolyte.

3. Electrolytic apparatus of the class described, having an electrolyte and an inactive part made of copper, and means for passing unidirectional current through the electrolyte to electroplate injurious metals out of the same.

4. Electrolytic apparatus of the class described, having anodes of filming metal and an inactive part made of copper.

5. An electrolytic condenser having an electrolyte, an anode of filming metal immersed therein, a source of unidirectional current having its positive pole connected with said anode, and a copper cathode in contact with the electrolyte and connected with the negative pole of the said source of current.

6. In electrolytic apparatus of the class described, a copper containing vessel or tank, an electrolyte therein, and filmed anodes immersed in the electrolyte.

7. In electrolytic apparatus of the class described, a copper containing vessel or tank, an electrolyte therein, a filmed anode immersed in the electrolyte, and means for electroplating on the copper tank injurious metal from the electrolyte.

8. In an electrolytic condenser, a copper containing vessel or tank, an electrolyte therein, an anode of filming metal immersed in the electrolyte, and a source of unidirectional current having its positive pole connected with said anode and its negative pole connected with the copper tank.

9. In electrolytic apparatus of the class described, a copper containing vessel or tank, an electrolyte therein, anodes immersed in the electrolyte, a source of unidirectional current having its positive pole connected to the anodes and its negative pole connected to the copper tank, and a plating anode immersed in the electrolyte and connected to the positive pole of said source.

10. An electrolytic condenser comprising a copper tank, an electrolyte therein, and an anode of filming metal immersed in the electrolyte.

11. Electrolytic apparatus of the class described, comprising a copper tank, an electrolyte therein, anodes of filming metal immersed in the electrolyte, and a copper rack for the anodes.

12. An electrolytic condenser having an electrolyte and susceptible of being harmfully affected by the presence of lead in the electrolyte, an anode of filming metal in the electrolyte, and a condenser member of copper in contact with the electrolyte.

13. The combination of a circuit having alternating and unidirectional components of voltage and current, and an electrolytic condenser having electrodes connected with said circuit, at least one of the electrodes being of copper and constituting a cathode, connected with the negative side of said circuit, and at least one of said electrodes being of filmed metal and connected with the positive side of said circuit.

14. The combination of a circuit having alternating and unidirectional components of voltage and current, and an electrolytic condenser having an electrolyte and having electrodes connected with said circuit, at least one of said electrodes being a vessel of copper, containing the electrolyte and serving as a cathode, connected with the negative side of said circuit, and at least one of said electrodes being of filmed metal and connected with the positive side of said circuit.

15. An electrolytic condenser having an electrolyte, a filmed anode, a copper member surrounding the anode, and an exciting circuit having its positive side connected with the anode and its negative side connected with the copper member.

16. The combination of a circuit having alternating and unidirectional components of voltage and current, and an electrolytic condenser having an electrolyte and a filmed anode therein connected with the positive side of said circuit, and a copper member surrounding the anode and connected with the negative side of said circuit.

17. An electrolytic condenser having an electrolyte and filmed and unfilmed electrodes; and means for passing unidirectional current through the electrolyte to plate injurious metal out of the same upon an unfilmed electrode.

18. The combination of a circuit having alternating and unidirectional components of voltage, and an electrolytic condenser having an electrolyte and electrodes therein connected with said circuit, at least one of said electrodes being of non-filming metal connected with the negative side of said circuit, and at least one of said electrodes being of filmed metal and connected with the positive side of said circuit; whereby the alternating voltage on the filmed metal electrode is prevented from causing flow of current from the electrolyte to the filmed metal by conduction through the film thereon, and injurious metal in the electrolyte is plated onto the non-filming electrode by conductive flow of current thereto.

In testimony whereof I hereto affix my signature.

RALPH D. MERSHON.

DISCLAIMER 1,784,674.—*Ralph D. Mershon*, New York, N. Y. FILM FORMATION AND OPERATION OF ELECTROLYTIC CONDENSERS AND OTHER APPARATUS. Patent dated December 9, 1930. Disclaimer filed May 17, 1938, by the patentee.

Hereby enters this disclaimer to claims 6, 10, and 12 of the said Letters Patent.
[*Official Gazette June 14, 1938.*]